United States Patent [19]

Powell

[11] Patent Number: 6,111,878
[45] Date of Patent: Aug. 29, 2000

[54] LOW JITTER TIMING RECOVERY TECHNIQUE AND DEVICE FOR ASYNCHRONOUS TRANSFER MODE (ATM) CONSTANT BIT RATE (CBR) PAYLOADS

[75] Inventor: William E. Powell, Raleigh, N.C.

[73] Assignee: Alcatel, Paris, France

[21] Appl. No.: 08/963,786

[22] Filed: Nov. 4, 1997

[51] Int. Cl.[7] .............................. G01R 31/08; H04J 3/06; H04L 25/36
[52] U.S. Cl. .......................... 370/395; 370/252; 370/516; 370/518; 375/372; 375/376
[58] Field of Search ..................... 370/395, 252, 370/503, 516, 517, 518, 397, 506, 508; 375/106, 111, 113, 371, 376, 354, 356, 372

[56] References Cited

U.S. PATENT DOCUMENTS

| | | | |
|---|---|---|---|
| 5,260,978 | 11/1993 | Fleischer et al. | 375/106 |
| 5,402,452 | 3/1995 | Powell et al. | 364/736 |
| 5,414,705 | 5/1995 | Therasse et al. | 370/60.1 |
| 5,528,530 | 6/1996 | Powell et al. | 364/736 |
| 5,563,877 | 10/1996 | Van Tetering et al. | 370/58.2 |
| 5,608,731 | 3/1997 | Upp et al. | 370/516 |
| 5,652,627 | 7/1997 | Allen | 348/497 |
| 5,790,543 | 8/1998 | Cloutier | 370/395 |
| 5,812,618 | 9/1998 | Muntz et al. | 375/372 |
| 5,912,880 | 6/1999 | Bernstein | 370/252 |
| 5,970,107 | 10/1999 | Bleiweiss et al. | 375/376 |

OTHER PUBLICATIONS

M. DePrycker "Asynchronous Transfer Mode", Ellis Horwood Ltd, Hertfordshire, U.K., 1993, Sec. 3.4.3, pp. 115–116; and Sec. 3–7–2, pp. 130–132; and FIG. 3.4, p. 112.

"Measured REsults for constant Bit Rate Service Delivery and Variable Bit Rate Traffic Management on an Multiservice ATM Network" L.Kenyon et al, National Fiber Optic Engineers Conference, Jun. 18–22, 1995 Boston, pp. 1041–1045.

Network Synchronization and the Synchronous Residual Time Stamp (SRTS) Method, R. Cubbage et al, Tlxl . 3/94–024, Jan. 13, 1994, Tlsl.5/94–070.

"Synchronous Techniques for Timing Recovery in BISDN", R. Lau et al, IEEE Transactions on Communications, vol. 43, No. 2/3/4, Feb./Mar./Apr. 1995, pp. 1810–1818.

"Cell Delay Variation in CBR Connections", S. Shah, Tlsl.5/94–115, Tlxl.3/94/054.

Itu Recommendation I.363 03/93, pp. 10–16.

"Simulation Results on the Recovered Timing by SRTS with Non–Ideal Source and Reference Clocks", K. Jung et al, Tlxl 3/95–013, pp. 1–9.

"TDEVs of Recovered Timing by SRTS Synchronization Scheme with Non–Results", K. Jung, Tlxl 3/94–078, pp. 1–7.

(List continued on next page.)

*Primary Examiner*—Huy D. Vu
*Assistant Examiner*—M. Phan

[57] ABSTRACT

An existing synchronous residual time stamp (SRTS) algorithm (76, 78, 80, 82, 106, 104) is used in conjunction with adaptively filtered buffer fill information (74) to reconstruct an original constant bit rate (CBR) payload clock rate (102) for asynchronous transfer mode (ATM) CBR payloads (88, 96). The SRTS time stamp (96) is used as the primary factor used to recover the payload clock rate, but a secondary payload frequency correction factor (112) is generated by filtering (118, 120) the desynchronizer buffer fill position. This correction factor is determined as part of a feedback arrangement which adaptively (128) alters the filtering time constant based on the offset position of the buffer from its center. In this way, payload clock frequency (102) is corrected, even in the presence of loss of synchronization PRS traceability between mapping and desynchronizer nodes to keep the desynchronizer buffer from overflowing.

4 Claims, 4 Drawing Sheets

OTHER PUBLICATIONS

"Simulation Results on Timing Performance of MPEG Over ATM: The Case of AAL1 and SRTS Network Timing Reocvery", K. Jung et al, Tlxl 3–95–069, pp. 1–9.

"Jitter/Wander Analysis of Adaptive Clock Recovery for Constant Bit Rate Services over ATM", M. Mulvey et al, *BT Technol. J.*, vol. 13, No. 3, Jul. 1995, pp. 46–51.

"Analytical Methods for Timing Aspects of the Transport of CBR Services over ATM", A. Reid et al, *BT Technol. J.*, vol. 13, No. 3, Jul. 1995, pp. 26–34.

"Timing Issues of Constant Bit Rate Services over ATM", M. Mulvey et al, *BT Technol. J.*, vol. 13, No. 3, Jul. 1995, pp. 35–45.

"Synchronization and Timing of SDH Networks", W. Powell et al, *Electrical Communication*, 4th Qtr. 1993, pp. 349–358.

"A Framework for Clarifying SRTS Issues", B. Kittams, TlS1.5/94–152, pp. 1–4.

R. Onvural, "Asynchronous Transfer Mode Networks: Performance Issues", Artech House, 1994, pp. 28–30.

"Is ATM Really Asynchronous", C. Howe, National Fiber Optic Engineers Conference, Jun. 18–22, 1995, Boston, pp. 1046–1055.

"SRTS Reference Documents and Comments", R. Brown, Tlxl.3/95–096.

"User Network Interface (UNI) Specification Version 3.1", The ATM Forum Technical Committee, pp. 72–90.

"DS1 and DS3 Jitter Accumulation in a Network of ATM Islands with SRTS Timing Recovery—Initial Results", G. Garner, T1X1.3/96–012.

(PRIOR ART)

FIG. 3

(PRIOR ART)

LOW JITTER TIMING RECOVERY TECHNIQUE AND DEVICE FOR ASYNCHRONOUS TRANSFER MODE (ATM) CONSTANT BIT RATE (CBR) PAYLOADS

BACKGROUND OF THE INVENTION

1. Technical Field of the Invention

The present invention relates to payload clock recovery in an ATM network node desynchronization for constant bit rate (CBR) services and, more particularly, to an improvement to a synchronous residual time stamp (SRTS) clock recovery technique.

The present invention thus also relates to the ATM adaptation layer (AAL) of asynchronous transfer mode (ATM) communication networks and, more particularly, to that class of services transported over the ATM layer in which the services are connection oriented, have a constant bit rate (CBR) and have a time relation between source and destination (SRTS-AAL, type 1; may also apply to AAL 5, where there is a relationship between frequency output and source clock at encoder, e.g., video).

2. Discussion of Related Art

The concept of a residual time stamp (RTS) is described in the article, "Synchronous Techniques for Timing Recovery in BISDN", by Richard C. Lau and Paul E. Fleischer, in *IEEE Transactions on Communications,* Vol. 43, No. 2/3/4, February/March/April 1995, pp. 1810–1818.

A known algorithm for carrying out this concept mimics the bit stuffing method of mapping a digital signal 1 (DS1) or digital signal 3 (DS3) payload into a virtual tributary (VT) or synchronous transport signal level 1 (STS1) synchronous payload envelope (SPE) already known from the synchronous optical network (SONET) standard promulgated by the American National Standards Institute (ANSI) by means of standard T1.105.x-199y. The known algorithm is only defined for the optimistic assumption that loss of synchronization traceability at different parts of the public telephone network is rare. The SRTS algorithm is defined in ANSI T1.630-1993, in Bellcore TA-NWT-001113, by the International Telecommunications Unit (ITU) in ITU-T Recommendation I.363, and ATM Forum specifications wherein SRTS is to be used for AAL 1 mapped CBR payloads such as DS1, DS3, and fixed bit rate video. As suggested above, the already-defined SRTS algorithm defines a normal mode condition, traceability to a network primary reference source (PRS) with a long-term accuracy of $10^{-11}$ or better, as well as a degraded mode condition (loss of PRS synchronization traceability), which is stated to not be part of the SRTS standardized definition.

If one were to implement the SRTS algorithm alone in a desynchronizer for a CBR service, when synchronization traceability to a PRS is lost, either temporarily or long-term, constant desynchronizer buffer spills could occur. The rate of buffer spills is dependent on the desynchronizer buffer size and the network synchronization frequency error between the mapping and desynchronizer nodes.

SUMMARY OF INVENTION

The object of the present invention is to provide an improved CBR timing recovery algorithm that not only uses available SRTS time stamp information for payload clock rate reconstruction, but also incorporates adaptive filtered desynchronizer fill information to guard against buffer spills and resulting payload corruption.

According to the present invention, an improved device for recovering, at a receiving node of an ATM network, a source clock frequency used at a transmitting node for sending ATM cells through the network to the receiving node by reference to a first network derived clock frequency derived at the transmitting node from a network clock, wherein a residual time stamp (RTS) provided from the transmitting node via the ATM cells to the receiving node is indicative of a difference frequency between the source clock frequency and the first network derived clock frequency and wherein the RTS is compared at the receiving node to a second network derived clock frequency derived at the receiving node also from the network clock for providing a difference signal indicative of the source clock frequency, plus or minus a differential frequency indicative of any difference between the first network derived clock frequency and the second network derived clock frequency, wherein the improvement comprises an adaptive filter, for use in the receiving node, responsive to the difference signal indicative of the source clock frequency and to a buffer position signal indicative of a fill level of a buffer of the receiving node for storing payload data of the ATM cells received at the receiving node, for providing the difference signal indicative of the source clock frequency corrected by the adaptive filter.

The basic idea is to use the existing SRTS algorithm in conjunction with adaptively filtered buffer fill information to reconstruct the original CBR payload clock rate. That is, the SRTS time stamp is used as the primary factor to generate the payload clock rate. A secondary payload frequency correction factor is generated from filtering the desynchronizer buffer fill position. This correction factor is determined as part of a feedback arrangement which adaptively alters the filtering time constant based on the offset position of the buffer from its center.

In this way, not only is the payload clock frequency corrected even in the presence of loss of Primary Reference Source (PRS) synchronization traceability between mapping and desynchronizer nodes, thereby keeping the desynchronizer buffer centered, but the actual average phase of the payload source clock and the payload destination clock is, on average, preserved, minimizing the probability of buffer spills due to sync network transients and holdover conditions, as well as changes to the payload source rate.

These and other objects, features and advantages of the present invention will become more apparent in light of the following detailed description of a best mode embodiment thereof, as illustrated in the accompanying drawing.

DETAILED DESCRIPTION OF PREFERRED EMBODIMENTS

Figure 1:
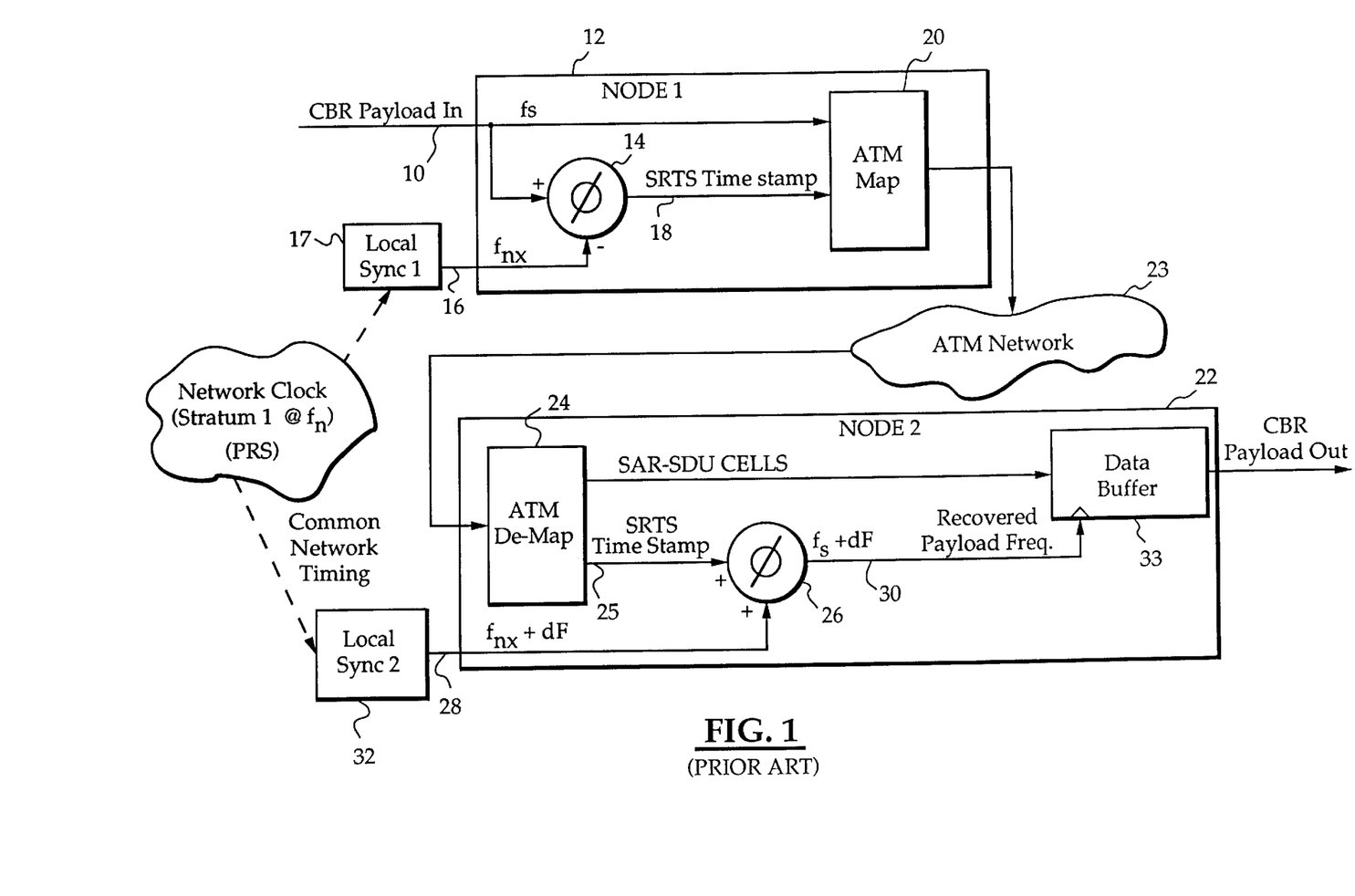
FIG. 1 shows a prior art transmitting node for transmitting a CBR payload through an ATM network having a desynchronizer at a receiving node that utilizes a synchronous residual time stamp inserted at the transmitting node for recovering the payload clock frequency at the receiving node.

FIG. 1 shows a typical prior art network application for constant bit rate (CBR) payload mapping into an AAL 1 format using the SRTS algorithm disclosed by Lau et al in the above-mentioned article, "Synchronous Techniques for Timing Recovery in BISDN". A CBR payload on a line 10 may comprise forty-seven octets of user information provided to a first or transmitting node 12 at a source clock frequency $f_s$. In other words, the CBR signal is segmented into 47-octet units having a bit rate $f_s$ for transmission in ATM cells over a network. It should be realized that the signal on the line 10 may be provided by an SAR-SDU conversion block (not shown) for stripping off the first octet of the segmentation and reassembly (SAR) structure for AAL1 shown in FIG. 2 as comprising forth-eight octets and described in detail below.

The source frequency $f_s$ is compared in a comparator 14 with a first network derived clock frequency $f_{nx}$ on a line 16 from a "local sync 1" source 17. The local sync source 17 is responsive, i.e, is traceable to a Stratum 1 clock having an accuracy of $10^{-11}$ or better. The result of the comparison is a Synchronous Residual Time Stamp (SRTS) signal on a line 18, to be described in more detail below and indicative of a difference between the source clock frequency $f_s$ and the first network derived clock frequency $f_{nx}$. I.e., $f_s - f_{nx} \rightarrow \Delta f_{SRTS}$. The 47-octet units on the line 10 are then mapped with the SRTS time stamps on the line 18 in an ATM mapping unit 20, which provides the time stamp information in a convergence sublayer (CS) indication bit shown along with three bits of a sequence number (SN) and four bits of a sequence number protection (SNP) block in the altogether forty-eight octets illustrated in FIG. 2, which are preceded by five (not shown) octets assigned to be the header of a fifty-three octet ATM cell.

Figure 2:
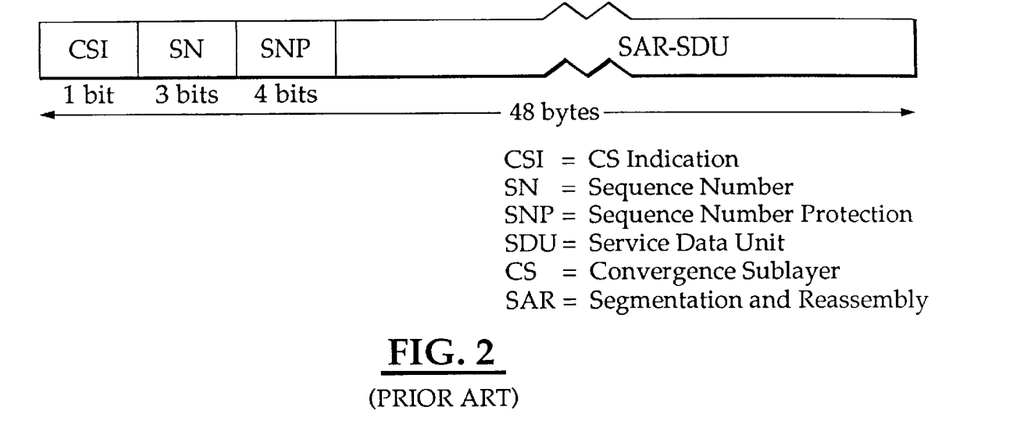
FIG. 2 shows the segmentation and reassembly (SAR) structure for ATM adaptation layer 1, i.e., adaptation for constant bit rate (CBR) services, according to the prior art.

FIG. 2 shows the above-mentioned segmentation and reassembly (SAR) structure for AAL 1. As described in Section 3.4.3 of the book "Asynchronous Transfer Mode", Second Edition by Martin DePrycker, published by Ellis Horwood, 1993, the ATM adaptation layer enhances the service provided by the ATM layer of an Open Systems Interconnection (OSI) model which is extendable to all sorts of communication systems as shown in FIG. 3.4 of the above mentioned book. The ATM adaptation layer, as described in Section 3.4.3, is subdivided into two sublayers including a segmentation and reassembly (SAR) sublayer and a convergence sublayer (CS), the latter of which performs functions like message identification, time/clock recovery, etc.

"Adaptation for constant bit rate (CBR) services: AAL 1" is described in Section 3.7.2 of the above mentioned DePrycker book at pages 130–132 thereof. There, the layer services provided by the AAL type 1 to the AAL user are described as including (1) transfer of service data units (SDU) with a constant source bit rate and their delivery with the same bit rate, (2) transfer of timing information between source and destination, (3) transfer of data structure information, and (4) indication of lost or errored information which is not recovered by the AAL itself, if needed.

According further to DePrycker, the convergence sublayer (CS) depends on the particular service; source clock recovery at the receiver may be accomplished by several methods including the CCITT recommendation of using the Synchronous Residual Time Stamp (SRTS) method. There, a Residual Time Stamp (RTS) is used to measure and convey information to the receiver about the difference between a common reference clock derived from the network at both the sender and receiver, and the service clock of the sender. The RTS is transported in the CS Indication (CSI) bits of successive Segmentation And Reassembly (SAR) Protocol Data Units (PDUs).

At a receiver or desynchronizer 22 in FIG. 1, after traversing a network 23, the SAR sublayer thus gets a known 48-byte block from the ATM layer, and then separates the SAR protocol data unit (PDU) header octet. The 47-octet block of SAR-SDU payload is passed to the CS. All of this is shown in the above-mentioned DePrycker book, in Sec. 3.7.2. Associated with each 47-octet SAR-SDU, there is provided a sequence number (SN) value from the CS of the sending unit. At the receiving end, this number is passed to the peer CS. It may be used to detect loss and mis-insertion of SAR payloads, i.e., to detect lost or inserted cells. As further shown by DePrycker, the SAR layer has also the capability to indicate the existence of the CS layer. Associated with each 47-octet SAR-SDU, a CS indication bit is provided.

De-mapping is generally illustrated by an "ATM De-Map" block 24 in the receiving node 22 in FIG. 1. With a straightforward implementation of payload clock recovery using a recovered SRTS on a line 25, as summed in a summer 26 with a local sync signal on a line 28 in the desynchronizer of the receiving node 22, an offset to the original payload frequency $f_s$ occurs on a line 30 when there is a difference (dF) in synchronization frequency ($f_{nx}$) between the local sync 17 signal on the line 16 at node 1 and the local sync signal on the line 28 from a "local sync 2" source 32. The synchronization offset causes a payload frequency offset, which in turn causes a ramping in payload phase in the desynchronizer buffer proportional to the frequency difference dF. The exact equation for the ramp rate is $$\frac{\Delta \phi}{\Delta T} = \frac{dF}{f},$$

where $\Delta\phi$ equals the phase movement of payload in a $\Delta T$ time period, and dF/f is the fractional frequency offset of the two sync signals. Thus, if the sync signal f=1.544000 and dF equals 1.544 Hz, $dF/f=1.544/1.544 \times 10^6 = 1$ ppm. I.e., $\Delta\phi/\Delta T=1$ microsecond/second.

The receiver 22 usually includes a data buffer 33 (shown in simplified form) responsive to SAR-SDU cells from the ATM De-Map block 24 and to the recovered payload clock on the line 30 for providing a CBR payload output, as shown in FIG. 1.

The above-mentioned article by Lau et al at page 1817 discusses that even in the synchronous mode of operation, the phase of the reference clock may have short-term fluctuation. However, according to Lau et al, as far as SRTS is concerned, this short-term phase error can easily be absorbed by using a slightly larger size for the RTS and data buffer.

The SRTS is, as is known in the art, an improvement over the prior art time stamp (TS) approach, where a network clock ($f_{nx}$) was used to drive a multi-bit counter (e.g., 16-bits) which was sampled every fixed number of generated cells (e.g., 16). In that case, a fixed number, N, of service clock cycles (N) were used as a reference. The full sampled value of the 16-bit counter was used as the time stamp for conveying a frequency difference between the local transmitting source clock ($f_s$) and the network derived clock ($f_{nx}$) The two bytes of the time stamp were to be transmitted via the convergence sublayer (CS) overhead, i.e., a 16-bit binary number occurring once every N service clock cycles. This required a somewhat heavy overhead burden.

Figure 3:
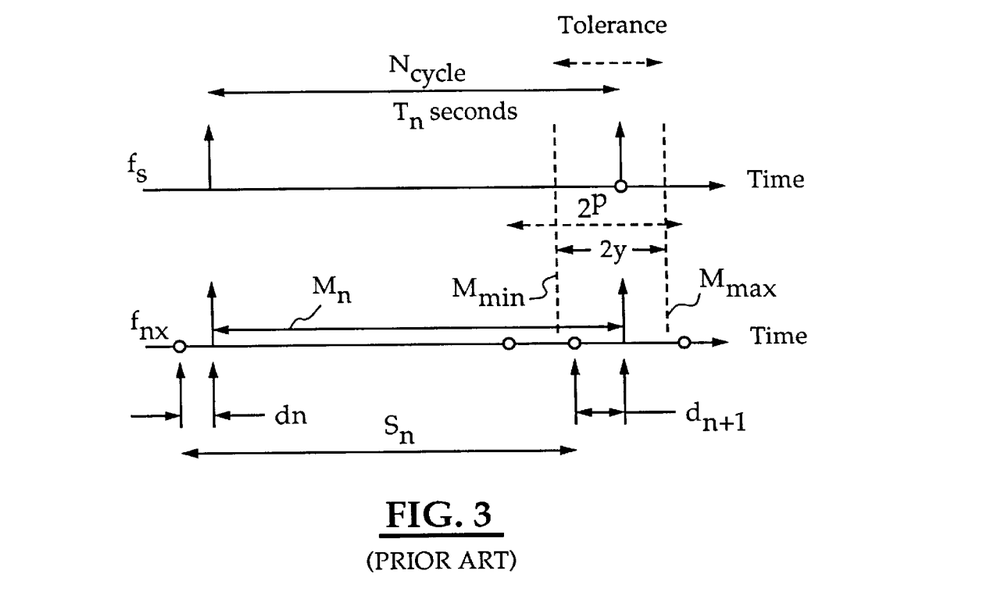
FIG. 3 shows the synchronous residual time stamp (SRTS) concept, according to the prior art.

Due to the insight by Lau et al, as shown in FIG. 3 hereof, that the actual number of network clock cycles, M (where M is not necessarily an integer), deviates from a nominal known number of cycles by a calculable deviation (2y), it was realized that it was not necessary to transmit a digital representation of the full quantized actual number (M) of network clock cycles within the interval. Only a representation of that number as it exists within a defined window (Tolerance=2y) surrounding an expected, or nominal, number of network clock pulses ($M_{nom}$ or $M_n$) is transmitted from the source node to the destination node in an ATM network. This is the meaning of the above-mentioned residual time stamp, as fully disclosed in the above-mentioned article "Synchronous Techniques for Timing Recovery in BISDN", by Richard C. Lau et al.

As explained by Lau et al, for accurate clocks, the range of $M_n$ is very tightly constrained, i.e., $M_{max}-M_{min}=2y$ is much less than $M_n$, and the variation in $S_n$ is also much smaller than its magnitude. It therefore follows that $$[M_{min}+d_n] \leq S_n \leq [M_{max}+d_n].$$

Since the maximum and minimum of $d_n$ are one and zero respectively, $S_n$ is bounded by $$[M_{min}] \leq S_n \leq [M_{max}]+1.$$

As pointed out by Lau et al, this implies that the most significant portion of $S_n$ carries no information, and only the least significant portion needs to be transmitted. This is the basic idea of the prior art RTS. As expressed below, the minimum resolution required to represent the residual part of $S_n$ unambiguously is a function of N, the ratio of the network derived frequency to the source frequency, and the source clock tolerance, $\pm\epsilon$.

For example, in the Lau article, where N is defined as the period of the RTS in units of the source clock ($f_s$) cycles, let N=3008, i.e., the number of bits in eight cells, each having forty-seven octets (see SAR-SDU of FIG. 2). If the network clock frequency ($f_n$) is equal to 155.52 MHz ($T_{nx}=6.430\times 10^{-9}$s) and the source clock frequency is 78.16 MHz (nominal) with $T_s=12.79\times 10^{-9}$s, then M nominal=$N\times T_s/T_{nx}$=5985.2119, i.e., there are nominally 5,985.2119 network-derived clock edges in the $T_n$ seconds of the N cycles of the source clock.

If the tolerance of the source clock frequency ($\epsilon$) is known in parts per million, according to the above article by Lau et al, then the maximum deviation between $M_{nom}$ and $M_{max}$ or $M_{min}$ is defined by the relation $$y = N \times \frac{f_{nx}}{f_s} \times \epsilon.$$

For the example where $f_{nx}$=155.52 MHz and $f_s$=78.16 MHz (nominal), and the RTS sampling period is 3008, and the source clock tolerance is 200 ppm, i.e., $\pm 200\times 10^{-6}$, it follows from the above expression that y=1.197. From this, it can be seen that it is superfluous to transmit the full $S_n$, which equals $M_n+D_n$, where $D_n$ is the leftover fractional part from the previous interval.

Figure 4:
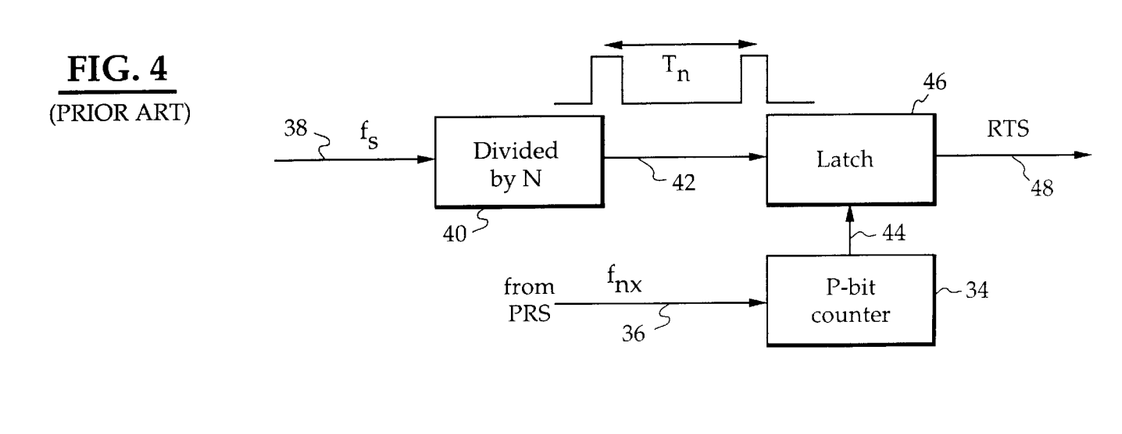
FIG. 4 shows an SRTS transmitter for a transmitting node, such as node 1 of FIG. 1, according to the prior art.

As shown for a transmitting node in FIG. 4 (such as the node 12 of FIG. 1), the number of bits required to represent the number of network clock cycles within $N_{cycle}$ is substantially reduced by selecting the number of bits, P, so that all $2^P$ possible different bit patterns uniquely and unambiguously represent the range of possible numbers of network clock cycles within the fixed tolerance interval. This is signified in FIG. 3 by the size of $2^P$ being broader than that of 2y.

Thus, a free-running P-bit counter 34 counts clock edges of clock cycles in a first network derived clock signal $f_{nx}$ on a line 36 which is derived from the network clock (PRS). The service clock $f_s$ on a line 38, which is derived from the incoming data signal to be transmitted over the ATM network, is divided in a divider 40 by the factor of N to produce a pulse signal on a line 42 having the RTS period $T_n$ seconds shown in FIG. 3. This defines the time interval for measuring the number (modulo $2^P$) of derived network clock pulses. At the end of each RTS period, the current count of the free-running P-bit counter on a line 44 is sampled in a latch 46. That sampled value is the RTS on a line 48, which is transmitted via the adaptation layer.

As shown in FIG. 1, since the service clock $f_s$ from which the RTS period is defined and the derived network clock $f_{nx}$ are neither synchronized nor integrally related in frequency, the actual number of derived network clock cycles in an RTS period is most unlikely to be an integer. Thus, when sampled at the receiving node 22 of FIG. 1 at the end of each RTS period, the increment in the count of the P-bit counter is a quantized version of the count (modulo $2^P$) pulses in the RTS interval, as modified by any accumulated fractional counts from a previous interval.

Figure 5:
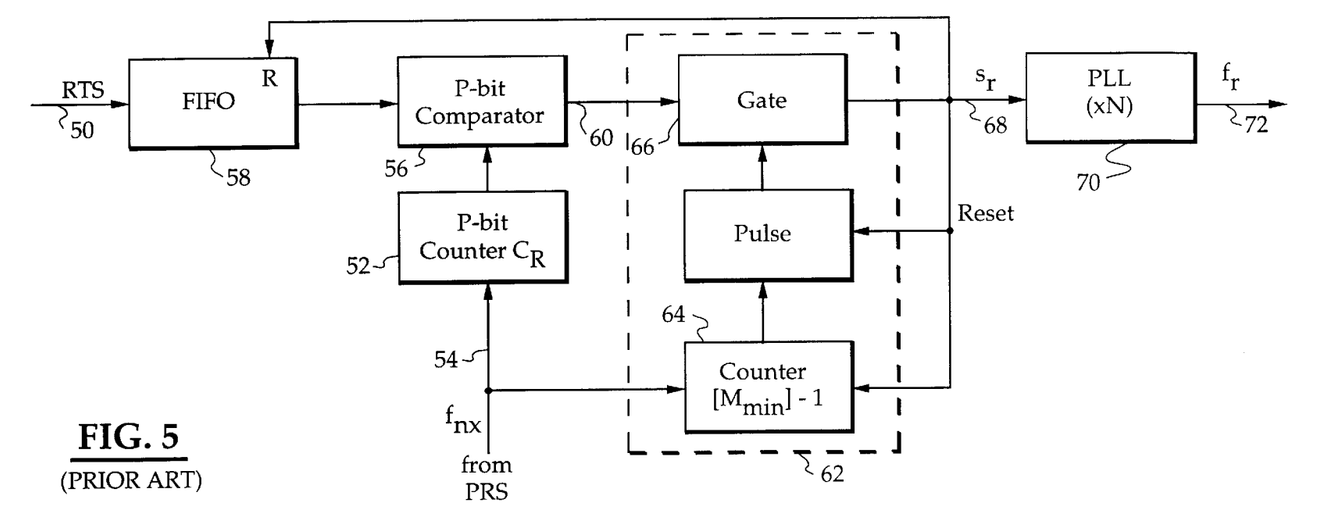
FIG. 5 shows an SRTS receiver for reconstruction of the source clock in a receiving node, such as node 2 of FIG. 1, according to the prior art.

As shown in FIG. 5, at the destination node, after the AAL is processed, the successive RTSs on a line 50 are converted into a pulse signal which has periods between pulses defined by the fixed integral numbers of derived network clock pulses that correspond to the conveyed RTS periods. Specifically, a free-running P-bit counter ($C_R$) 52 is driven by the derived network clock $f_{nx}$ on a line 54. A P-bit comparator 56 compares this count with a stored received RTS from a storage medium (FIFO) 58 and produces a pulse output on a line 60 upon a match. Since the count of the P-bit counter matches the stored RTS every $2^P$ derived network clock cycles, comparator output pulses that do not actually represent the end of the RTS period are inhibited by gating circuitry 62 shown in dashed lines in FIG. 5. This gating circuitry includes a second counter 64 that counts the derived network clock cycles occurring since the end of the previous RTS period. When this second counter reaches a count equal to the minimum possible number of derived network clock pulses within an RTS period, the next comparator pulse output on the line 60 produced upon a match between the RTS and the count of the P-bit counter is gated-through a gate 66 to an output line 68 and resets the second counter 64. The resulting gated-through output pulse stream on the line 68 drives a multiply-by-N phase-locked loop 70 to recover the service clock $f_r$ on a line 72 originally sent, as shown in FIG. 1, from node 12 (indicated there as fs) with the difference (dF) between "local sync 1" 17 and "local sync 2" 32 algebraically added, i.e., fs+dF, as shown on the line 30 in the receiver 22 of FIG. 1.

The above-mentioned Lau et al article discusses synchronization imperfection in Section G thereof, at page 1817–1819, and points out that the timing reference obtained in a synchronous network may be subject to degradations and impairments, including total loss of synchronization. A holdover mode is suggested where threshold limits of the RTS and data buffer should be monitored to detect such an event, and to revert to a separate, asynchronous operation, as shown in FIG. 11 thereof, using a "bang-bang" type of frequency adjustment. In other words, a switch is abruptly made from SRTS mode to asynchronous mode.

This degraded mode of operation shown in FIG. 11 of the Lau et al article is switched on during sync loss conditions. The desynchronizer clock is then derived based on desynchronizer buffer fill. However, in this mode, jitter will be much greater than the total network jitter allowance due to typically large ATM Cell Delay Variation (CDV can be up to 1–3 milliseconds for large networks) through the ATM network, as well as individual ATM switches.

A reconstruction of the payload clock rate in the desynchronizer based on buffer fill alone would thus not be easy to implement, due to ATM CDV. Typical values of CDV for a single ATM switch are on the order of about 9 microseconds. This represents a phase step, e.g., for a DS3 payload, of about 400 unit intervals (UI), where one DS3 unit interval is equal to 22.3 nanoseconds. This phase step would need to be filtered by a buffer-position based filtering algorithm with a desynchronizer bandwidth BW of $$BW \cong \frac{0.4}{\phi_{STEP}(UI)} \cdot 10 \text{ Hz}.$$

The 0.4 value in the equation above represents the required maximum of 0.4 UI jitter for mapping type conditions and 10 Hz is the DS3 jitter measurement high-pass filter. Thus, with a 400 UI phase step due to CDV, a desynchronizer filtering bandwidth of less than 0.01 Hz would be required. Maximum CDV for a single ATM switch can exceed 100 microseconds, which would drive desynchronizer bandwidths down below 0.001 Hz in order to limit jitter from CDV to less than 0.4 $UI_{pp}$ for a DS3 payload. The CDV, through multiple ATM switches and other equipment, can go even higher, e.g., as high as several milliseconds for typical ATM networks.

Figure 6:
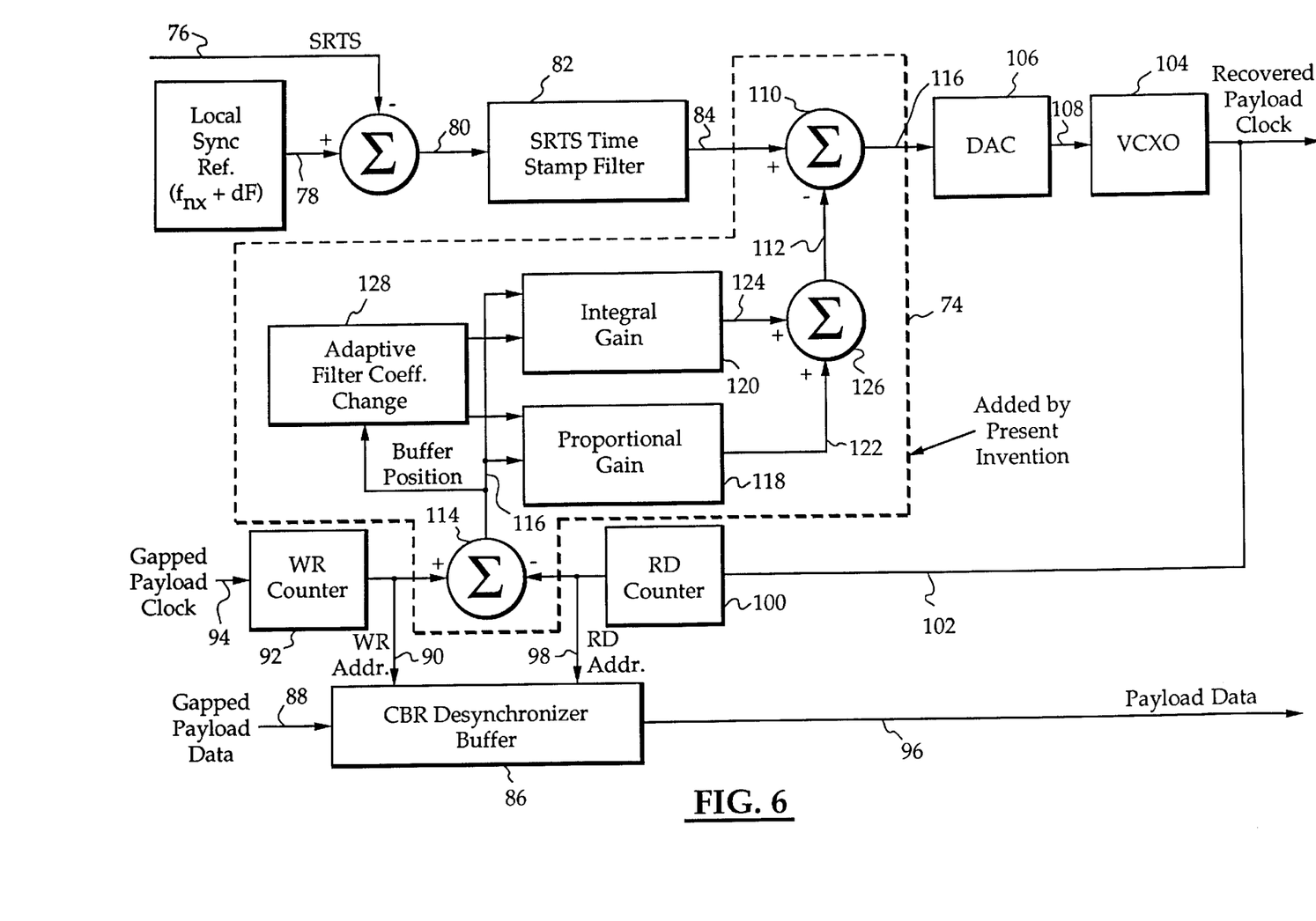
FIG. 6 shows an improved SRTS receiver, according to the present invention, having an adaptive filter added in-line with a feedback loop for providing a correction signal to the time stamp.

However, according to the present invention, FIG. 6 shows a CBR desynchronizer block diagram with in-line adaptive filtering. The basic idea is to use the existing SRTS algorithm, such as shown in FIG. 5, in conjunction with adaptively filtered buffer fill information, as shown in a new block 74, as added by the present invention, to reconstruct the original CBR payload clock rate. That is, the SRTS time stamp on a line 76 is used as the primary factor in comparison with the local sync reference on a line 78 to provide a primary indication on a line 80 used to generate the recovered payload clock rate, as in FIG. 5, with an SRTS time stamp filter 82 to provide a primary recovered payload clock signal indication on a line 84, similar to the signal on the line 68 of FIG. 5. A secondary, payload frequency correction factor is generated from filtering the desynchronizer buffer fill position using, e.g., the additions shown in the block 74 of FIG. 6. This correction factor is determined as part of a feedback arrangement which strives to keep the contents of a buffer 86 centered and which adaptively alters the filtering time constant based on an offset position of the buffer 86 from its center. The buffer will not always be centered, as the dF changes cause offsets. The added block 74 tries to re-center the buffer, which will take time. The net result is there will be movement in the buffer due to dF and CDV. The present invention keeps the buffer from overflowing.

A buffer, or elastic store, is well known in the art for use in storing gapped payload data input on a line 88 as stored in a memory location according to a write address on a line 90 provided by a write counter 92 as driven by a gapped payload clock on a line 94. Payload data on a line 96 is read from the buffer 86 (similar to the buffer 33 of FIG. 1) according to a read address signal on a line 98 provided by a read counter 100 driven by a recovered payload clock signal on a line 102, which is in turn provided by a variable frequency oscillator 104. A digital-to-analog converter 106 was, in the prior art, responsive to the output signal on the line 84 from the time stamp filter 82 for converting the digital signal on the line 84 to an analog signal on a line 108 for driving the variable frequency oscillator 104. However, according to the present invention, the signal on the line 84 is compared in a comparator 110 with a correction factor as represented on a signal line 112 for providing a difference signal on a line 116 to the digital-to-analog converter 106.

This correction factor on the line 112 is provided within the newly-added block 74, according to the present invention for correcting the time stamp on the line 84 in such a way as to keep the buffer centered. It is obtained by first comparing the output of the write counter 92 and the read counter 100 in a comparator 114, which provides a difference signal on a line 116 indicative of the buffer fill position. This buffer fill position signal on the line 116 is filtered, e.g., by a proportional-integral gain arrangement 118, 120, which provide respective proportional and integral gain signals on lines 122, 124 to a summing junction 126, where they are combined to form the correction signal on the line 112.

The time constant used for the proportional and integral amplifier can be changed according to the buffer fill position by an adaptive filter coefficient change mechanism, as illustrated in a block 128. If the buffer fill position is detected as straying from the center at an increasing amount, the time constant can be lowered, result in a wider adaptive filtering bandwidth to bring it back towards the center at a more rapid rate. As it is stabilized back to a center position, the time constant can be restored adaptively. Adaptive filtering time constants can be chosen such that the overall closed loop desynchronizer filtering bandwidth has low gain (less than 0.1 dB) so that multiple mapping/desynchronizer nodes (ATM islands) can be cascaded along with conventional CBR payload transport through multiple SONET islands, and so that applicable jitter specifications are observed for the CBR payload.

The algorithm can be implemented totally in the desynchronizer, with no change to the present SRTS definition. The expected rate of change of the local network synchronization reference frequency is an important parameter in setting filtering bandwidths and coefficients. The requirements for maximum synchronization frequency rate of change are under study, and both T1X1 and ETSI/ITU for both SONET NEs (ANSI Standard T1.105.09), as well as SDH NEs (ITU-draft Standard G.813) and network clocks (ITU-G.811 and G.812). Bellcore has issued a network clock standard (TR1244) for RBOC network clocks with a maximum $\Delta f$ of $2 \times 10^{-8}$ for stratum 3 network clocks (initial frequency step and holdover), $10^{-9}$ for stratum 3e network clocks (initial frequency step), and $10^{-10}$/day for stratum 2 network clocks.

In regard to the DAC 106 and VCXO 104 of FIG. 6, it should be realized that they could be replaced by a digital oscillator.

Similarly, although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method of constant bit rate (CBR) payload timing recovery for asynchronous transfer mode (ATM) cells using a synchronous residual time stamp (SRTS) algorithm wherein a time stamp (25) recovered at a receiving node (22) is compared to a local network derived clock frequency (28)

for providing a recovered CBR payload frequency (30), characterized in that the SRTS algorithm is used in conjunction with adaptively filtered buffer fill information for providing said recovered CBR payload frequency.

2. Apparatus for a constant bit rate (CBR) payload timing recovery for asynchronous transfer mode (ATM) cells, using a synchronous residual time stamp (SRTS) algorithm, including means for recovering a time stamp at a receiving node, means for comparing the recovered time stamp to a local network derived clock frequency for providing a recovered CBR payload frequency, characterized by means for adaptively filtering buffer fill information for providing said recovered CBR payload frequency in conjunction with said SRTS algorithm.

3. Device for recovering at a receiving node a source clock frequency (10) used at a transmitting node for sending asynchronous transfer mode (ATM) constant bit rate (CBR) cells through a network to the receiving node by reference to a first network derived clock frequency (16) derived at the transmitting node from a network clock, wherein a residual time stamp (RTS) signal (18) provided from said transmitting node via said ATM cells to said receiving node is indicative of a difference frequency between said source clock frequency and said first network derived clock frequency and wherein said RTS is compared at said receiving node to a second network derived clock frequency (28) derived at the receiving node from said network clock for providing a difference signal (30) indicative of said source clock frequency plus or minus a differential frequency (dF) indicative of any difference between said first network derived clock frequency and said second network derived clock frequency characterized by an adaptive filter (74), for use in said receiving node, responsive to said difference signal indicative of said source clock frequency and responsive to a correction signal (112) indicative of a fill level of a buffer (86) of said receiving node for storing payload data (88) of said ATM CBR cells received at the receiving node, for providing said difference signal indicative of said source clock frequency corrected by said adaptive filter.

4. The device of claim 3, wherein said adaptive filter is further characterized by:

a comparator (114), responsive to a buffer write address signal and a buffer read address signal, for providing a buffer position signal;

a proportional plus integral gain amplifier (118, 120), responsive to said buffer position signal, for providing said correction signal; and an adaptive filter coefficient change device, responsive to said buffer position signal, for providing a control signal, wherein said proportional plus integral gain amplifier is responsive to said control signal for changing parameters thereof.

* * * * *